Figure 1:
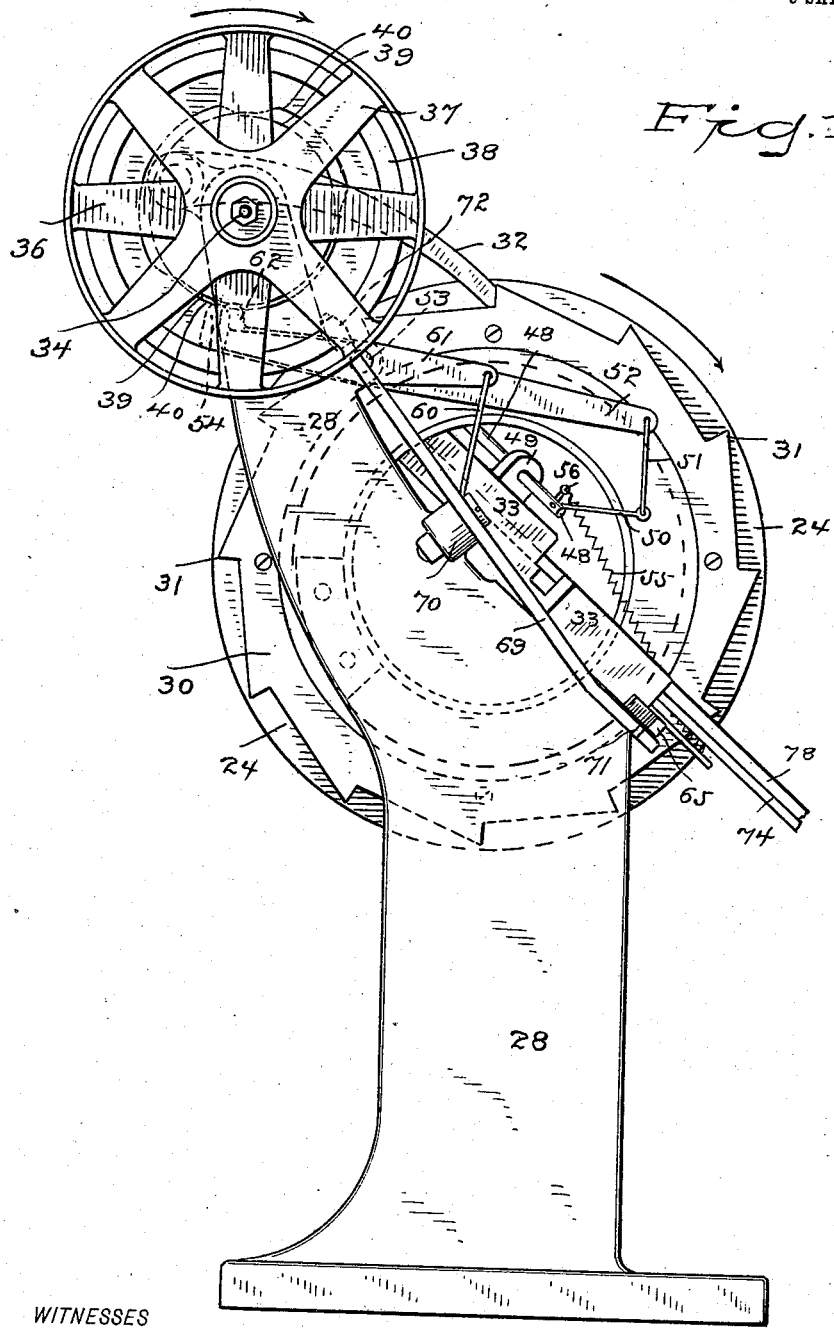

No. 867,404. PATENTED OCT. 1, 1907.
A. H. NILSON.
AUTOMATIC FEEDING MACHINE.
APPLICATION FILED FEB. 8, 1907.

5 SHEETS—SHEET 1.

WITNESSES

INVENTOR

BY

ATTORNEY

No. 867,404. PATENTED OCT. 1, 1907.
A. H. NILSON.
AUTOMATIC FEEDING MACHINE.
APPLICATION FILED FEB. 8, 1907.

5 SHEETS—SHEET 2.

WITNESSES
H. A. Lamb.
S. W. Atherton.

INVENTOR
Axel H. Nilson
BY
N. M. Wooster
ATTORNEY

No. 867,404.  
PATENTED OCT. 1, 1907.

A. H. NILSON.  
AUTOMATIC FEEDING MACHINE.  
APPLICATION FILED FEB. 8, 1907.

5 SHEETS—SHEET 3.

WITNESSES  
H. A. Lamb.  
S. W. Atherton.

INVENTOR  
Axel H. Nilson  
BY  
F. W. Wooster  
ATTORNEY

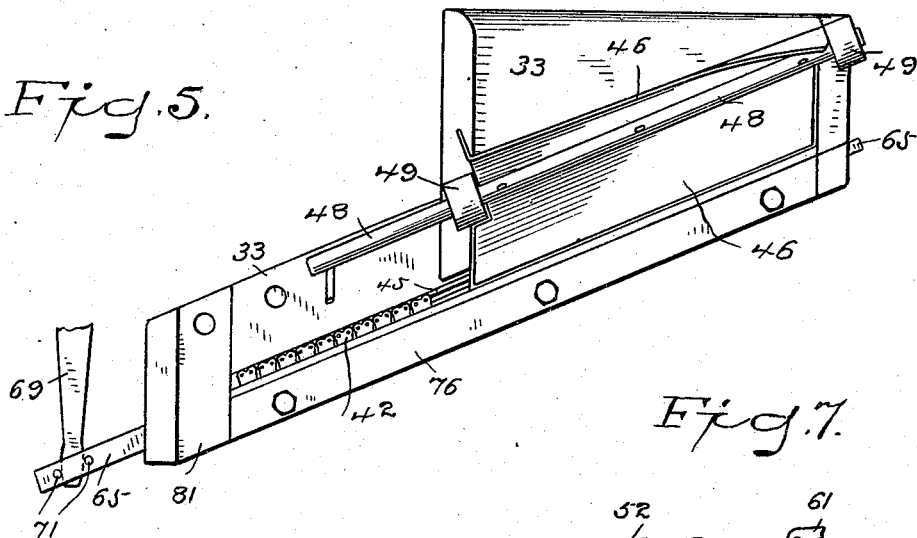
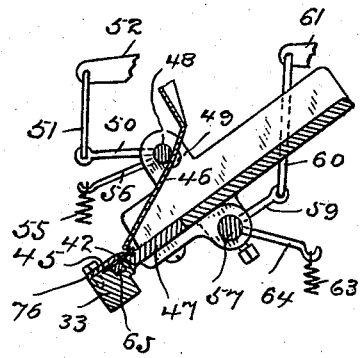
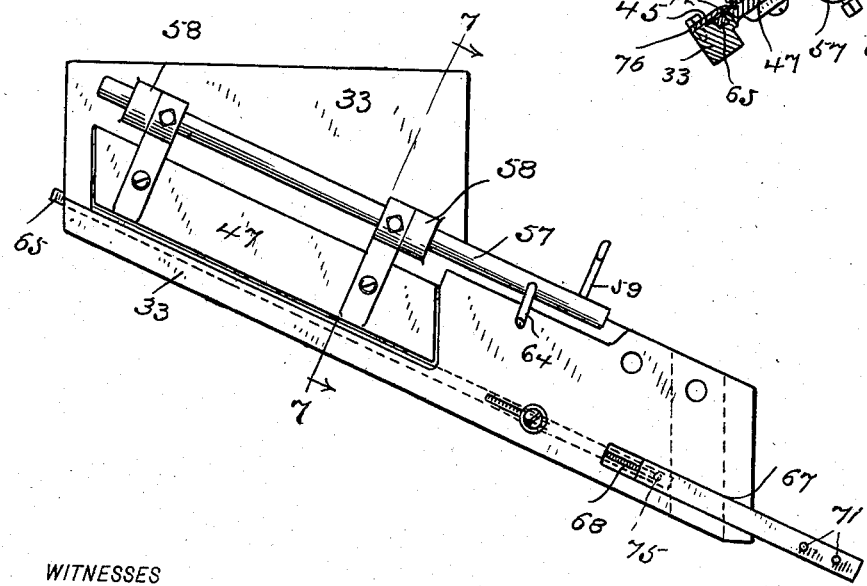

No. 867,404. PATENTED OCT. 1, 1907.
A. H. NILSON.
AUTOMATIC FEEDING MACHINE.
APPLICATION FILED FEB. 8, 1907.

5 SHEETS—SHEET 5.

WITNESSES
H. A. Lamb
S. W. Atherton

INVENTOR
Axel H. Nilson
BY
A. M. Wooster
ATTORNEY

UNITED STATES PATENT OFFICE.

AXEL H. NILSON, OF BRIDGEPORT, CONNECTICUT, ASSIGNOR TO THE A. H. NILSON MACHINE COMPANY, OF BRIDGEPORT, CONNECTICUT, A CORPORATION OF CONNECTICUT.

AUTOMATIC FEEDING-MACHINE.

No. 867,404.  Specification of Letters Patent.  Patented Oct. 1, 1907.

Application filed February 8, 1907. Serial No. 356,387.

*To all whom it may concern:*

Be it known that I, AXEL H. NILSON, a citizen of the United States, residing at Bridgeport, county of Fairfield, State of Connecticut, have invented a new and useful Automatic Feeding-Machine, of which the following is a specification.

This invention has for its object to provide a machine adapted for general use in feeding small articles, as corset eyes, automatically, and the invention consists in certain constructions and in certain parts, improvements and combinations which will be hereinafter described and then specifically pointed out in the claims hereunto appended.

In the accompanying drawings, forming a part of this specification, I have illustrated my invention as applied to a machine especially adapted for feeding corset eyes.

Similar reference characters indicate the same parts in all of the views.

Figure 2:
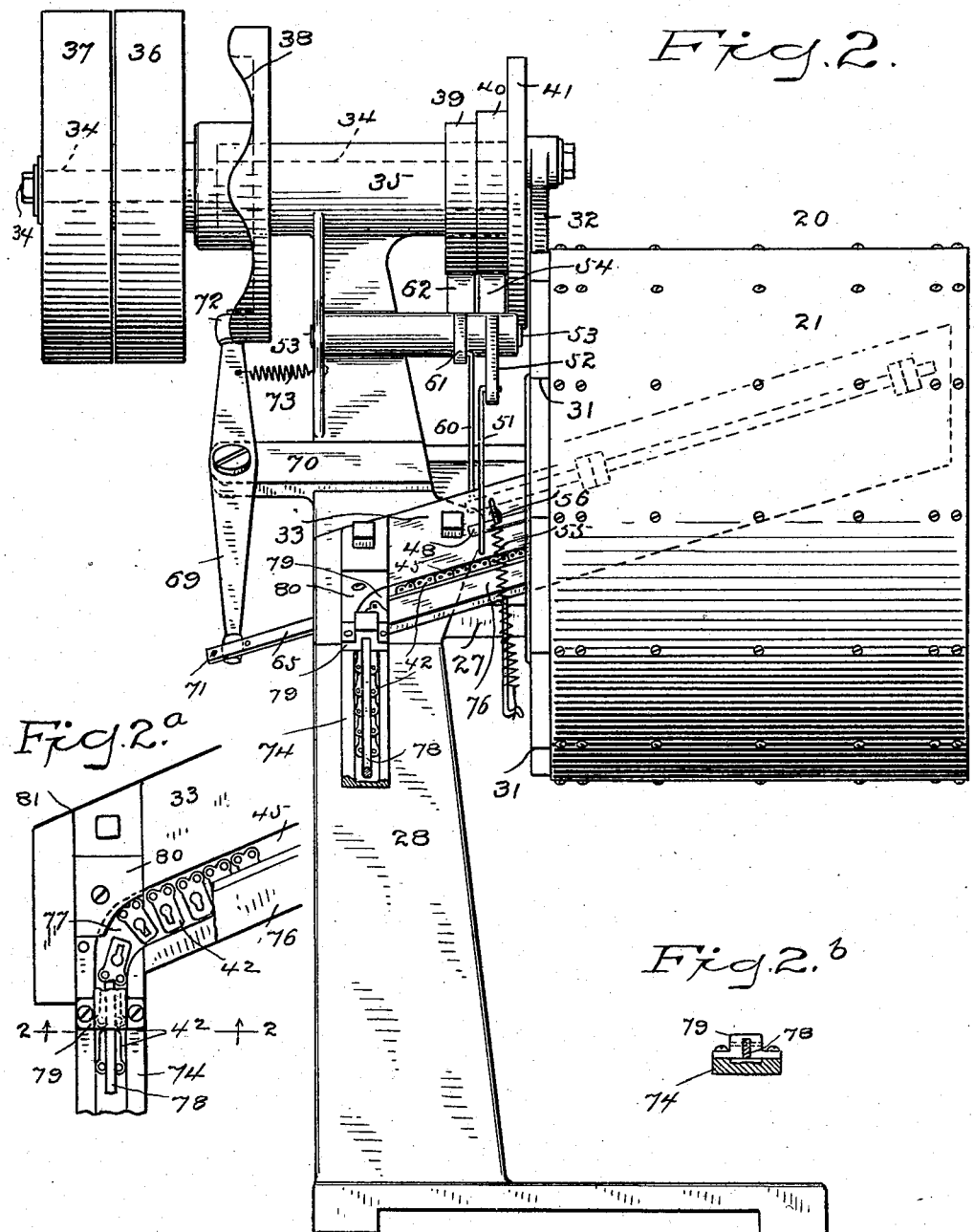
Figure 3:
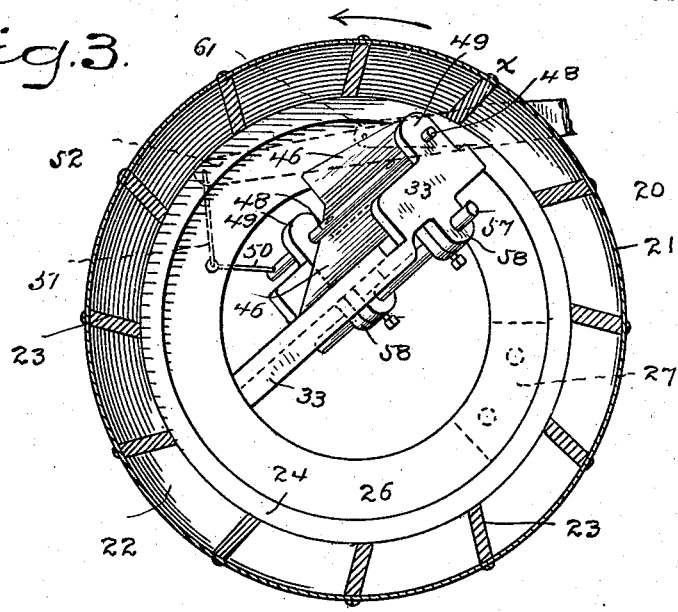
Figure 4:
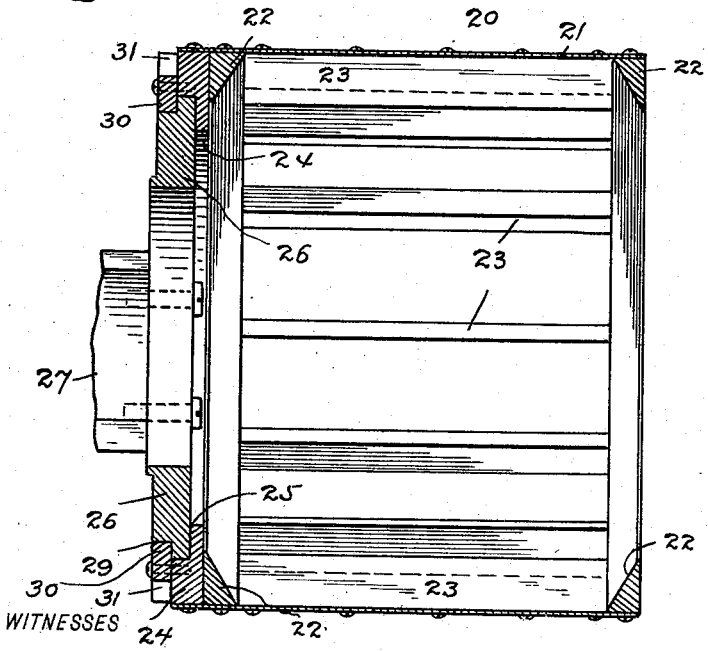
Figure 8:
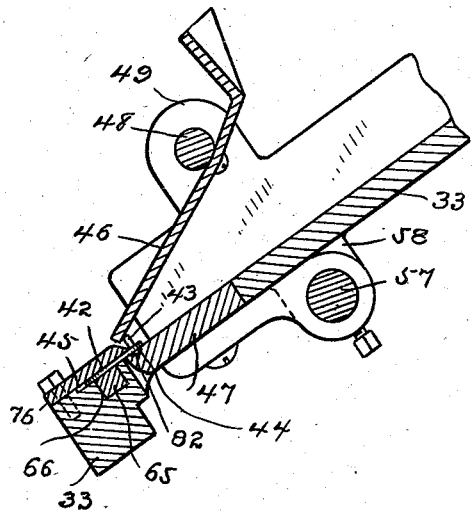
Figure 9:
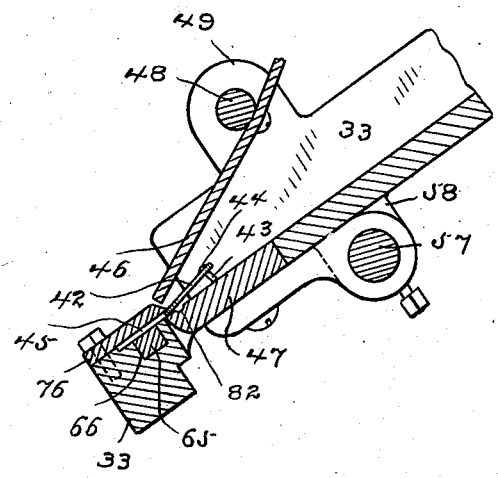
Figure 10:
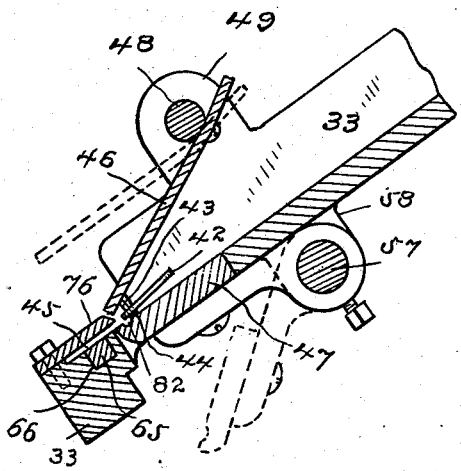
Figures 11, 12:
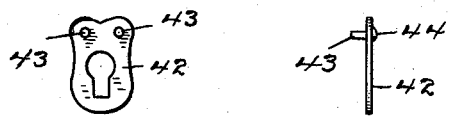

Figure 1 is an end elevation of the machine complete; Fig. 2 a side elevation as seen from the left in Fig. 1; Fig. 2ᵃ a detail view on an enlarged scale, partly broken away, illustrating the passage of the eyes from the receiving groove into the trough; Fig. 2ᵇ a section on the line 2—2 in Fig. 2ᵃ looking in the direction of the arrows; Fig. 3 a cross section of the barrel with the frame and gates in perspective as seen from the right in Fig. 2; Fig. 4 a longitudinal section of the barrel detached; Fig. 5 a side elevation of the frame and gates detached; Fig. 6 a reverse side elevation of the frame and gates detached; Fig. 7 a detail cross section on the line 7—7 in Fig. 6 looking in the direction of the arrows; Fig. 8 a similar view on an enlarged scale, illustrating the position in which a corset eye must be fed in order to pass into the receiving groove; Figs. 9 and 10 are similar views illustrating other positions assumed by corset eyes in which they cannot pass into the receiving groove, Fig. 10 also showing the open position of the gates in dotted lines; and Figs. 11 and 12 are views of the style of corset eyes which the machine illustrated is adapted to feed.

The eyes are placed loosely in a rotating barrel 20. This barrel may be of any ordinary or preferred construction but preferably consists of a sheet metal casing 21 attached to end rings 22, which may be of wood. Between the end rings and rigidly secured in place are buckets 23 which may be made of wood and are set obliquely to radial lines so that the eyes will be carried by the buckets nearly to the top before they will drop off, as will be more fully explained. Both ends of the barrel are shown as left open, the end rings acting to prevent the eyes from dropping out. At the inner end of the barrel is a metal ring 24 having an angular groove 25.

26 denotes a stationary ring which is rigidly secured to an arm 27 cast integral with or rigidly secured to a standard 28 by which all of the operative parts of the machine are carried. Stationary ring 26 lies in the groove in ring 24 and is itself provided with a groove 29 which receives a ring 30 having upon its outer periphery a ratchet 31.

It will be understood from Fig. 4 that ring 30 retains the barrel in place on ring 26 which serves as a bearing for the barrel, the latter being rotated intermittently by means of a pawl 32 engaging the ratchet, as will be more fully explained.

33 denotes a frame which is rigidly secured to the standard and extends obliquely outward and upward through rings 26 and 24 and nearly through the barrel but wholly independently of the barrel which rotates about it, as already described. The special angle of inclination of the frame to the axis of the barrel is unimportant so long as it is sufficient to permit the eyes to feed freely.

All of the operative parts of the machine receive movement from a single shaft 34 journaled in a bearing 35 upon the standard. This shaft receives power by means of a belt, not shown, passing over a pulley 36.

37 denotes a pulley loose on the shaft. The shaft carries a face cam 38, peripheral cams 39 and 40 and a disk 41 to which pawl 32 is pivoted.

42 (see Figs. 11 and 12) denotes corset eyes having rivets 43 set therein. 44 denotes the heads of the rivets which project slightly from the faces of the eyes. It is, of course, well understood that in use these eyes are secured by means of the rivets to corset steels. The function of this machine is to feed the eyes uniformly to a setting machine, no portion of which is illustrated, as it forms no part of the present invention. It is, of course, necessary that the eyes follow each other successively in the trough, that they feed by gravity, and that the eyes enter the receiving trough in one position only, that is, with the rivet ends upward and with the rivets projecting toward the front, as seen in Figs. 2 and 5.

The eyes, as already stated, are carried upward by the buckets in the barrel and when nearly at the top— as, for example, when a bucket is in the position indicated by X in Fig. 3—they drop off loosely into frame 33 and slide downward toward the receiving groove indicated by 45. The special construction of the frame is not of the essence of the invention and it is wholly unimportant of how many parts it is made or how they are secured together. As the eyes pass downward toward the receiving groove they lie loosely between an upper gate indicated by 46 and a lower gate indicated by 47, the gates forming a pocket above the receiving groove into which the eyes pass as they slide down the frame. In Fig. 8 I have illustrated the correct feeding position of an eye. The frame lies at an incline and the eyes can only pass into the receiving groove when they fall with the rivet ends upward and the heads of the rivets on the lower side, a groove 82 being provided in the lower gate to receive the heads of the rivets. In this position the eyes pass readily into the receiving groove, as clearly shown in Fig. 8. In Fig. 9 I have shown the position of an eye that has fallen with the rivet end upward but reversed; that is to say, the head of the rivet lies upward and the rivet projects downward, and in Fig. 10 I have shown the position of an eye that has fallen with the rivet end downward. In neither of these positions can the eyes pass into the receiving groove. During each rotation of the shaft the upper gate swings upward to the position shown in dotted lines in Fig. 10, and the lower gate swings downward to the position shown in dotted lines in said figure. When the gates open, all of the eyes that have not passed into the receiving groove in the correct position—that is, as in Fig. 8—are released and drop again into the bottom of the barrel. The upper gate is carried by a rock shaft 48 journaled in eyes 49 upon the frame.

50 denotes an arm extending from rock shaft 48 which is connected by means of a link 51 with a lever 52 which oscillates on a stud 53 that is rigidly secured in the standard. At the opposite end of lever 52 is a boss 54 which engages cam 40 on shaft 34, each rotation of the shaft acting to throw the gate to the open position as in dotted lines in Fig. 10. A spring 55 (see Fig. 7), connected to an arm 56 extending from rock shaft 48 and to any fixed portion of the machine, acts to return the upper gate to the closed position as soon as the high portion of cam 40 passes boss 54 on lever 52. Lower gate 47 is carried by a rock shaft 57 which is journaled in eyes 58 upon the frame. An arm 59 extending from rock shaft 57 is connected by means of a link 60 to a lever 61 which oscillates on stud 53. At the opposite end of lever 61 is a boss 62 which engages cam 39 on shaft 34, each rotation of the shaft acting to throw the lower gate to the open position as in dotted lines in Fig. 10. A spring 63 (see Fig. 7) connected to an arm 64 extending from rock shaft 57 and to any fixed portion of the machine acts to return the lower gate to the closed position as soon as the high portion of cam 39 passes boss 62 on lever 61.

The parts of the machine are so proportioned and timed that the upper gate opens first and remains open during approximately one-third of a revolution of the shaft. About an eighth of a revolution of the shaft, more or less, later the lower gate opens and remains open during approximately one-fourth of a revolution of the shaft. The upper gate returns to the closed position first and an instant later the lower gate returns to the closed position. It should be understood, however, that I do not limit myself to any special timing of the gates, as that is a matter that can be varied within reasonable limits in accordance with the requirements of use and without departing from the principle of the invention.

As already stated, the downward movement of the eyes in the receiving groove is by gravity, owing to the inclination of the frame. In order to keep them moving, however, and to prevent the possibility of clogging, I provide an agitating rod 65, which reciprocates in a groove 66 in the frame. This rod lies loosely in contact with the backs of the eyes and its relatively rapid reciprocatory movement insures the steady feeding downward of the eyes in the receiving groove. For convenience in construction the agitating rod is made in two parts, the lower portion of said rod lying in a groove 67 in the opposite side of the frame from groove 66, the two parts of said rod being connected by a pin (see dotted lines at 75 in Fig. 6) which passes through a slot 68 in the frame and connects the two parts of the agitating rod. The agitating rod is reciprocated by means of a rock lever 69 fulcrumed on an arm 70 extending from the standard. One end of lever 69 engages the agitating rod by means of pins 71 projecting therefrom, and the other end is provided with a roller 72 which bears upon the face of cam 38. The face of this cam consists of a plurality of bosses and depressions so that a plurality of reciprocations is imparted to the agitating rod during each rotation of the shaft. A spring 73 connected to lever 69 and to any fixed portion of the machine acts to retain the roller in engagement with the face of the cam.

The receiving groove is shown as formed by frame 33 and a plate 76 secured thereto. The eyes, as already explained, can only enter this groove with the rivet end up and the rivets projecting toward the front as the machine is seen in Figs. 2 and 5. The eyes feed in this groove by gravity assisted by agitating rod 65. From the receiving groove the eyes pass into a trough 74 by which they are conducted to a setting machine or wherever they are to be used. The upper end of the trough lies in a groove 81 in frame 33 and is rigidly bolted to the frame. Turning now to Fig. 2ª (which see in connection with Figs. 2 and 5), it will be seen that the eyes pass into the trough with the rivet ends downward; that is, they change ends in passing from the receiving groove into the trough. This is effected by providing a turn as at 77 at the point where the trough connects with the receiving groove. At this point the upper ends of the eyes are perfectly free while the lower ends are slightly retarded by their engagement with the bottom of the receiving groove. The turn is abrupt and as the upper or rivet ends of the eyes are heaviest, the upper ends naturally drop downward by gravity, causing the eyes to change ends and pass into the receiving groove with the rivet ends downward. The trough receives them loosely and they are retained in position therein and clogging is prevented by means of a central guide strip 78 which is secured to bridge pieces 79, one only being shown. The eyes pass freely under the guide strip, the rivets lying on opposite sides thereof, as clearly shown in the drawings. A cover plate 80 partly overlies the trough at the turn and the rivet ends of the eyes therein and prevents the eyes from flying out.

Having thus described my invention, I claim:

1. A device of the character described comprising a rotating barrel having buckets by which the articles to be fed are carried upward, an inclined frame within the barrel upon which the articles drop and which is provided with a receiving groove that can only receive them in proper position, gates upon the frame above the receiving groove which normally form a pocket for the articles as they slide down the frame and operating mechanism by which the gates are opened to permit the articles that do not pass into the receiving groove to drop into the barrel.

2. A device of the character described comprising a rotating barrel having buckets by which the articles to be fed are carried upward, an inclined frame within the barrel upon which the articles drop and which is provided with a receiving groove that can only receive them in proper position, gates upon the frame above the receiving groove which normally form a pocket for the articles as they slide down the frame and operating mechanism by which the gates are opened to permit the articles that do not pass into the receiving groove to drop into the barrel, and are held open for a predetermined time and are then closed.

3. A device of the character described comprising a rotating barrel having buckets by which the articles to be fed are carried upward, an inclined frame within the barrel upon which the articles drop and which is provided with a receiving groove that can only receive them in proper position, gates upon the frame above the receiving groove which normally form a pocket for the articles as they slide down the frame and operating mechanism by which the gates are opened successively, for the purpose set forth, and are then closed.

4. A device of the character described comprising a rotating barrel having buckets by which the articles to be fed are carried upward, an inclined frame within the barrel upon which the articles drop and which is provided with a receiving groove that can only receive them in proper position, upper and lower gates upon the frame above the receiving groove, mechanism for opening the upper gate, retaining it open for a predetermined time and then closing it and mechanism for opening the lower gate after the upper gate has been opened, retaining it open a predetermined time, and then closing it.

5. In a machine of the character described the combination with a standard, a barrel carried thereby and provided with internal buckets for the purpose set forth, and mechanism for rotating the barrel, of a frame rigidly secured to the standard and projecting into the barrel at an incline to the axis of the barrel, said frame being provided with a receiving groove which can only receive the articles to be fed in one position, upper and lower gates hinged to the frame, which in the closed position form a pocket for the articles above the receiving groove and means for opening the gates to permit articles that have not passed into the receiving groove to drop into the barrel.

6. In a machine of the character described the combination with a standard and a rotating barrel having internal buckets, of an inclined frame projecting into the barrel and provided with a receiving groove for articles to be fed, hinged gates upon the frame which permit articles that do not pass into the receiving groove to drop into the barrel and an agitating rod in the frame lying in contact with articles in the receiving groove whereby clogging of the articles is prevented.

7. In a machine of the character described the combination with a standard, a rotating barrel and mechanism for imparting intermittent rotation to the barrel, of a frame secured to the standard and projecting into the barrel at an incline, said frame being provided with a receiving groove, gates hinged to the frame above the receiving groove and forming a pocket for the purpose set forth, mechanism for opening and closing the gates at predetermined times, for the purpose set forth, and an agitating rod reciprocating in the frame whereby articles in the receiving groove are prevented from clogging.

8. In a machine of the character described the combination with the standard, the barrel having a ratchet, the inclined frame projecting into the barrel and provided with a receiving groove, and gates hinged to the frame, of a shaft carrying cams 39 and 40 and a disk 41, connections intermediate the cams and the gates whereby the latter are opened and closed and a pawl pivoted to the disk and engaging the ratchet on the barrel whereby intermittent rotation is imparted thereto.

9. In a machine of the character described the combination with the standard, the barrel having a ratchet, the inclined frame projecting into the barrel and provided with a receiving groove, gates hinged to the frame and the agitating rod, of a shaft carrying cams 38, 39 and 40 and a disk 41, connections intermediate cams 39 and 40 and the gates whereby the latter are opened and closed, a pawl pivoted to the disk and engaging the ratchet on the barrel, for the purpose set forth, and a rock lever engaging cam 38 and the agitating rod whereby the latter is reciprocated.

10. In a machine of the character described the combination with the standard, the barrel having a ratchet, the inclined frame projecting into the barrel and provided with a receiving groove, and gates hinged to the frame, of a shaft carrying cams 39 and 40 and a disk 41, levers engaging the cams, connections intermediate the levers and the gates whereby the latter are opened and closed and a pawl pivoted to the disk and engaging the ratchet on the barrel, substantially as described, for the purpose specified.

11. In a machine of the character described the combination with a rotating barrel having internal buckets, a frame projecting into the barrel at an angle to the axis thereof and provided with a receiving groove, and gates upon the frame which permit articles that do not pass into the groove to drop into the barrel, of a trough connected to the receiving groove and provided with a turn so that articles will change ends in passing from the groove to the trough and a guide strip under which the articles pass and by which they are retained in the trough.

12. In a machine for feeding corset eyes with rivets set therein, the combination with a rotating barrel having internal buckets, an inclined frame projecting into the barrel and provided with a receiving groove that can only receive the lower ends of the eyes when the rivets project upward and gates upon the frame which permit the eyes that do not pass into the groove to drop into the barrel, of a trough connected to the groove and provided with a turn in which the eyes change ends and the rivet ends drop downward, and a guide strip secured to the trough centrally under which the eyes pass with the rivets on opposite sides thereof.

13. In a machine of the character described the combination with an inclined frame having a receiving groove that can only receive articles in one position, means for supplying articles to the frame and hinged gates upon the frame which permit articles that do not pass into the groove to drop off, of a trough connected to the receiving groove into which the articles pass.

14. In a machine for feeding corset eyes with rivets set therein, the combination with an inclined frame having a receiving groove that can only receive the lower ends of the eyes when the rivets project upward, means for supplying eyes to the frame and gates upon the frame which permit eyes that do not pass into the groove to drop off, of a trough connected to the receiving groove and provided with a turn in which the eyes change ends and the rivet ends drop downward and a central guide strip secured to the trough under which the eyes pass with the rivets on opposite sides thereof.

15. In a machine of the character described, the combination with a rotating barrel having buckets on its inner periphery, of a frame extending into the barrel and inclined downward and outward, said frame being provided with a receiving groove for the purpose set forth, a gate 46 hinged to the frame and mechanism for opening and closing said gate, substantially as described, for the purpose specified.

16. In a machine of the character described, the combination with a rotating barrel having buckets on its inner periphery, of a frame extending into the barrel and inclined downward and outward, said frame being provided with a receiving groove for the purpose set forth, gates 46 and 47 hinged to the frame and mechanism for opening and closing said gates, substantially as described, for the purpose specified.

17. In a machine of the character described, the combination with a rotating barrel having buckets on its inner periphery, of a frame extending into the barrel at an incline, for the purpose set forth, gates 46 and 47 hinged to the frame which in the closed position form a pocket into which articles drop from the buckets before passing to the receiving groove and mechanism for opening and closing the gates.

18. In a machine of the character described, the combination with a rotating barrel having buckets on its inner periphery, of a frame extending into the barrel at an incline and provided with a receiving groove, gates 46 and 47 hinged to the frame which in the closed position form a pocket into which articles drop from the buckets before passing to the receiving groove, mechanism for opening and closing the gates and a rod reciprocating in the frame whereby articles in the receiving groove are prevented from clogging.

In testimony whereof I affix my signature, in presence of two witnesses.

AXEL H. NILSON.

Witnesses:
A. M. WOOSTER,
S. W. ATHERTON.